Feb. 23, 1971 J. E. BARKER 3,565,600
METHOD FOR MAKING SALT SUSPENSION FERTILIZERS HAVING
FREE AQUEOUS AMMONIA, TRIAMMONIUM
PHOSPHATE AND POTASSIUM CHLORIDE
Filed Dec. 10, 1969 2 Sheets-Sheet 1

INVENTOR
JAMES E. BARKER
BY
ATTORNEY

INVENTOR
JAMES E. BARKER
BY William L. Pelliam
ATTORNEY

United States Patent Office 3,565,600
Patented Feb. 23, 1971

3,565,600
METHOD FOR MAKING SALT SUSPENSION FER-
TILIZERS HAVING FREE AQUEOUS AMMONIA,
TRIAMMONIUM PHOSPHATE AND POTASSIUM
CHLORIDE
James E. Barker, Freehold, N.J., assignor to Cities Service
Company, New York, N.Y., a corporation of Delaware
Continuation-in-part of application Ser. No. 586,754,
Oct. 14, 1966. This application Dec. 10, 1969, Ser.
No. 884,033
Int. Cl. C05b 7/00
U.S. Cl. 71—36
2 Claims

ABSTRACT OF THE DISCLOSURE

Aqueous ammonia and a monammonium-diammonium phosphate base material are separately supplied to a mixing zone, such as afforded by a high speed centrifugal pump, potassium chloride being also concurrently introduced into said zone, and the said materials are subjected therein to an extremely turbulent mixing environment. The endothermic heat of solution of the potassium chloride dissolving in the base material counteracts the exothermic heat of reaction between the base material and the aqueous ammonia.

CROSS REFERENCE TO RELATED APPLICATION

Figure 1:
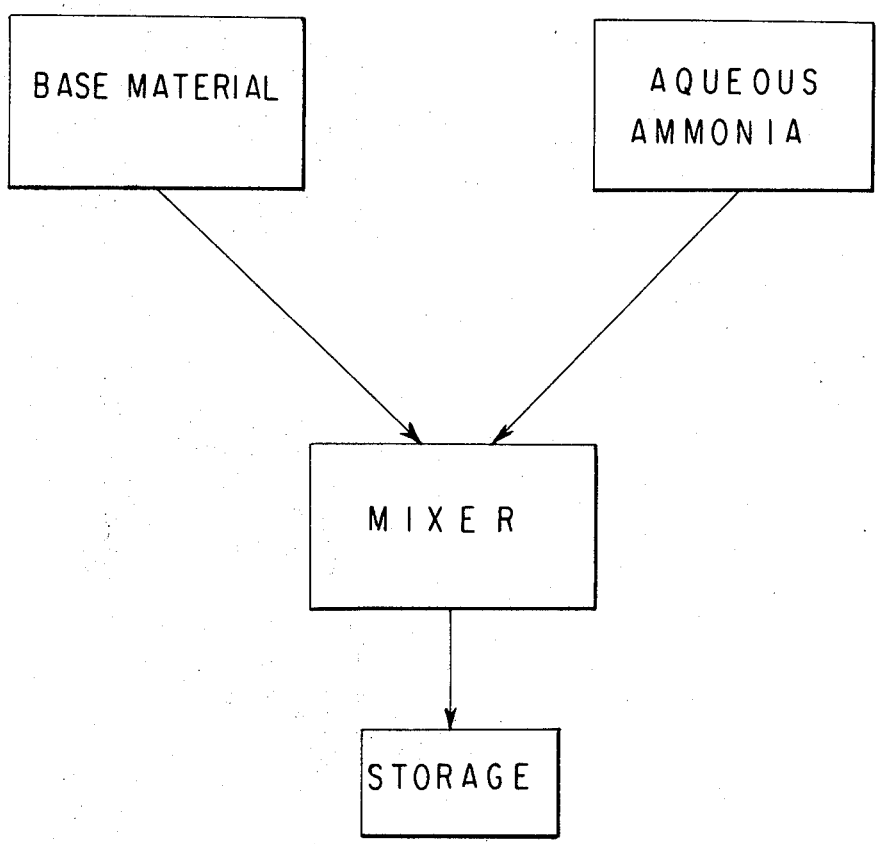

This application is a continuation-in-part of my earlier filed and now abandoned application Ser. No. 586,754 entitled "Method for Making Salt Suspension Fertilizers Having Free Aqueous Ammonia," filed Oct. 14, 1966.

SUMMARY OF THE INVENTION

This invention relates to a novel process for manufacturing a slurry or salt suspension fertilizer, particularly the grades having free aqueous ammonia, in order to prevent the formation of excessively large particles in the suspension, as well as preventing loss of ammonia through vaporization.

Salt suspension or slurry fertilizers have increasingly become important in the fertilizer industry, because they retain the fluidity of liquid fertilizers having the plant nutrient in solution, while permitting higher nutrient contents, greater flexibility in formulation as solubility does not provide specific limits, and the use of less expensive materials. Furthermore, they avoid the problems of caking and dusting, and of segregation and ballistic separation of blended materials which are found in conventional solid fertilizers.

Conventional salt suspension fertilizers generally contain nitrogen, phosphorus and potassium compounds as the primary plant nutrients. The nitrogen is generally present either as aqueous ammonia, ammonium salts, nitrates, and/or urea. Phosphorus is generally included as a phosphate, while potassium is included preferably as muriate of potash (potassium chloride, KCl), although potassium nitrate and potassium sulfates are also used. It is common fertilizer grades in terms of the nitrogen (N), phosphorus (P), and potassium (K) content by weight either as a direct ratio of N–P–K or as a percentage by weight of the N–P–K components of the fertilizer. The phosphorus content is expressed in terms of the equivalent weight of phosphorus pentoxide ($P_2O_5$), while the potash component is expressed as the equivalent weight of potassium oxide ($K_2O$). For example, a fertilizer described as a 4–3–3 or as a 12–9–9 grade has a weight ratio of 4 parts nitrogen to 3 parts phosphorus pentoxide to 3 parts potassium oxide formed from the N,P,K contents of the fertilizer even though all the potassium is in the form of potassium chloride, and the phosphorus is in the form of phosphates. Similarly 12–9–9 represents the percentages by weight of the N–P–K components expressed as the above salts in the whole fertilizer.

For economically adding nitrogen to the fertilizer, ammonia is a relatively low cost material and is therefore a preferred source of nitrogen, making it advantageous to include as much ammonia as is practical in the fertilizer composition. In addition to the ammonium salt content, free aqueous ammonia provides a means for including additional nitrogen economically in the salt suspension fertilizer. A salt suspension fertilizer having a concentration of between 10% and 15% by weight of aqueous ammonia is generally preferred, the upper limit being controlled by the atmospheric or storage conditions to prevent vapor loss of the ammonia.

A problem encountered in the manufacture of salt suspension fertilizers containing free aqueous amonia is the formation of firm granules of triammonium phosphate trihydrate, upon adding aqueous ammonia to the ammonium phosphates base material. The granules of triammonium phosphate trihydrate thus formed tend to settle out of suspension immediately and clog pipes and equipment through which the resultant salt suspension fertilizer is pumped. Additionally, the presence or inclusion of a potash nutrient such as muriate of potash would result in the formation of potassium sulfate crystals out of solution, and increase the aforesaid deleterious effects of the triammonium phosphate trihydrate granules. Ordinarily, the mixing of the aqueous ammonia and ammonium phosphate is by batch in a tank having a paddle type stirring device which provides for adequate mixing but doesn't prevent the formation of the aforementioned granules.

A solution to this problem has been to use oversize pipes and pumps, and to feed the resultant salt suspension fertilizer to a disintegrating device such as a "turbo disperser" to break up the clumps of granules into smaller granules in order to improve the storage and handling qualities. The use of the larger pipes, and pumps and the high power and cost requirement of the disintegrating device are serious disadvantages in this process. Furthermore, the resultant product still doesn't exhibit good long range storage properties, as granules which tend to settle out are present in the fertilizer suspension.

It is therefore the object of my invention to provide a novel process for making an improved salt suspension fertilizer having free aqueous ammonia.

Another object of this invention is to provide a method of preventing the growth of triammonium phosphate trihydrate in a granule form which settles out of suspension and/or clogs liquid fertilizer application equipment.

My invention is a novel process which provides for the formation of an improved salt suspension fertilizer having free aqueous ammonia in which the particles of triammonium phosphate trihydrate are of a uniform size and tend to remain in suspension. To obtain this result, the invention provides that the addition of aqueous ammonia to the phosphate base material take place in an extremely turbulent mixing environment, such as is provided by a high speed centrifugal pump. Unlike the conventional method of mixing the ammonia with the N–P base material, which results in large firm granular formations, the product of the present invention is in the form of very fine crystals of triammonium phosphate trihydrate which tend to remain in suspension and exhibit superior storage properties.

Any of various known methods for making a liquid fertilizer having a nitrogen and phosphate content can be used to supply the base material for producing a salt suspension fertilizer of the present invention. Preferably, the base material comprises a liquid fertilizer mixture having a N to P to K ratio between 1-3-0 and 1-4-0. However, other suitable N-P-K ratios are also applicable base materials for this manufacturing process. In addition, sulfate ion as described in my co-pending application Ser. No. 849,164 filed Aug. 11, 1969 for Salt Suspension Fertilizers, can be added either as a sulfate of calcium or ammonium or as sulfuric acid to produce the improved salt suspension fertilizer which is the subject of my co-pending application.

A base salt suspension fertilizer composition may be prepared from diammonium phosphate and wet process phosphoric acid (WPA), in which the diammonium phosphate and wet process phosphoric acid are used in a mol ratio of 2 to 1 whereby the diammonium phosphate neutralizes the acid, producing a mixture of monoammonium and diammonium phosphates and dicalcium phosphate. The dicalcium phosphate acts as a suspending agent in the resulting base material. A salt suspension formulation resulting from this process would have a 1-4-0 ratio, and be a 7-28-0 formulation.

In the process of the present invention as shown in FIG. 1 of the drawing the base formulation and the aqueous ammonia are separately added to a mixer which provides an extremely turbulent environment for the reaction and which results in the formation of triammonium phosphate trihydrate in aqueous ammonia as part of the suspension. The mixer may be any one of conventional apparatus for providing an extremely turbulent mixing at the point of addition of the ingredients. An in-line mixer, a centrifugal pump or a turbo-disperser are illustrative of the type of apparatus which can be used to provide the proper turbulent mixing, with the base material and the aqueous ammonia being separately fed to the intake ports thereof. It is important to note that the aqueous ammonia and the base material do not come into contact with each other prior to entering the extreme turbulence mixer, and that the entering fluids are immeditely subject to the turbulent mixing during reaction.

Figure 2:
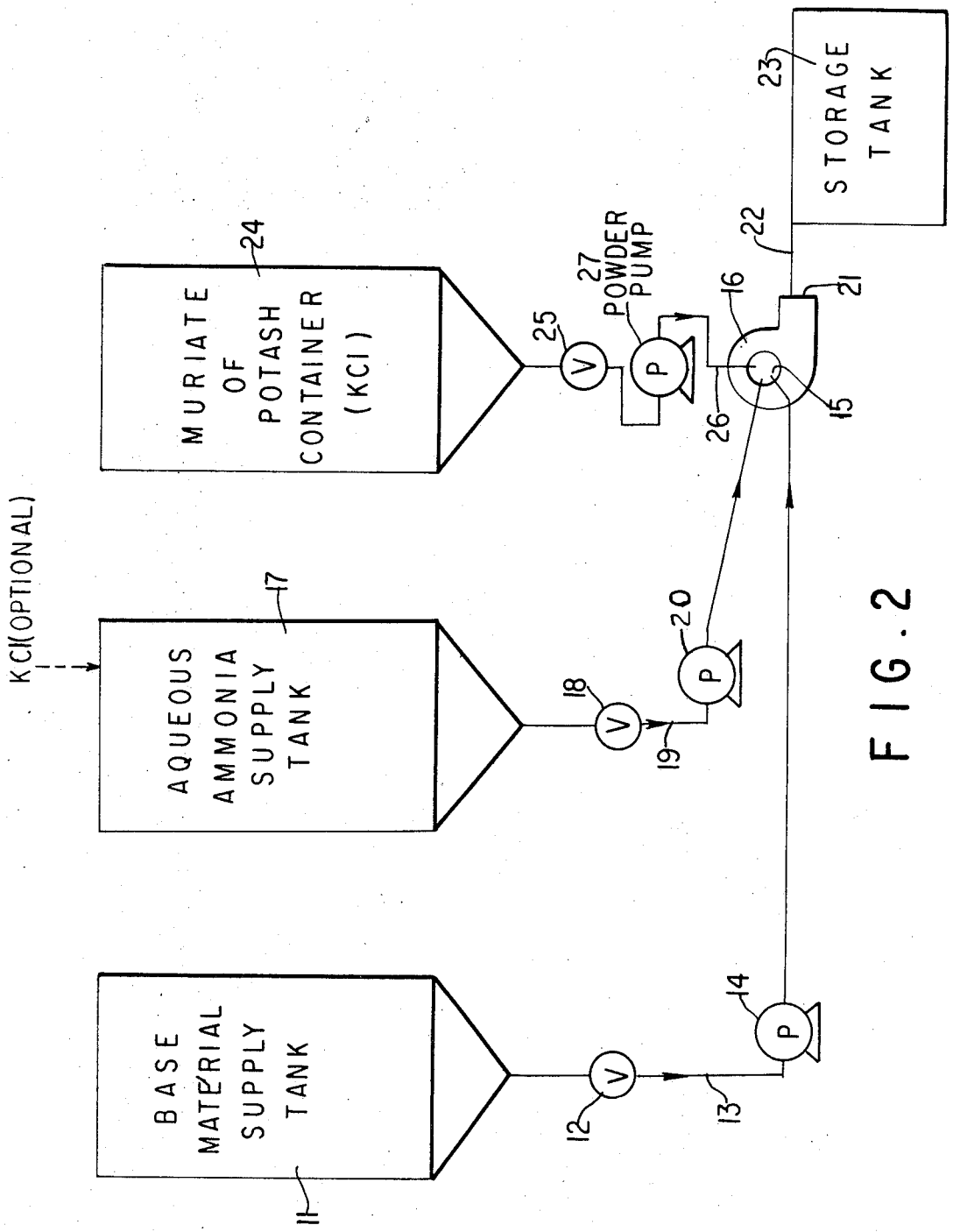

As shown by FIG. 2, of the drawings, a base material comprising a neutralized nitrogen phosphorus composition is produced or supplied in the base material supply tank 11. The base material supply tank 11 is connected with suitable valves 12, piping 13 and a pump 14 to provide a positive feed to the intake port 15 of the centrifugal pump 16. An aqueous ammonia supply tank 17 is connected by suitable valve 18, piping 19, and a pump 20 to the intake port 15 of the centrifugal pump 16. The centrifugal pump exhaust 21 is connected by pipe 22 to the storage tank 23. The base material is pumped from tank 11 at a determined rate as controlled by valve 12 to the intake port 15 of the centrifugal pump 16. The base material and the aqueous ammonia are subjected to extremely turbulent mixing by the high speed rotation of the pump, and the resultant salt suspension fertilizer is piped to the storage tank 23. The centrifugal pump need only be adequate to provide extreme turbulence and pumping action for unlike the disperser used in conventional methods, it need not be high powered nor of required close tolerance to break up any previously formed granules or solid materials into small particles.

Figure 3:
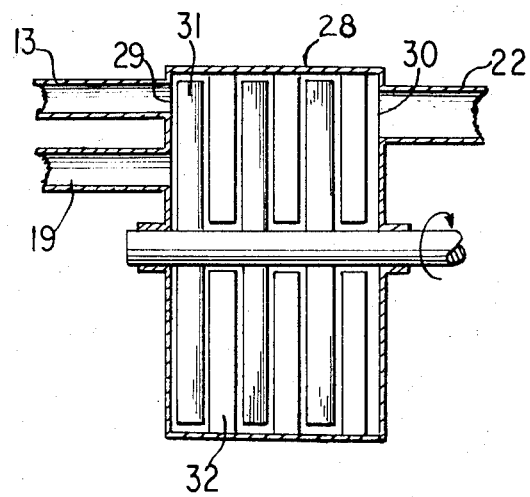

An in-line mixer as shown by FIG. 3 of the drawings may be used in place of the centrifugal pump. The base material and the aqueous ammonia are separately and simultaneously pumped through pipes 13 and 19 respectively to the intake port 29 of the mixer. The in-line mixer has a housing 28, an inlet 29, into which feed pipes 13 and 19 are attached, and an outlet port 30, to which storage pipe 22 is attached. A series of circular mounted rotor blades 31 are mounted circumferentially and axially spaced on a shaft, which is rotatably mounted on bearings in the housing 28, and axially spaced alternatively with the rotor blades 31. The rotation of the shaft and the rotor blades 31, causes the base material and the aqueous ammonia upon being fed by pipes 13 and 19 through inlet port 29, to be turbulently mixed by the rapidly moving blades. As the turbulence, rapid mixing and pumping action of the in-line mixer, prevents the formation of any large particles of either triammonium phosphate trihydrate, or other material, no disintegrating apparatus requiring high power and close clearances to break up any large preformed particles is needed.

Additionally, if it were desired to produce a complete N-P-K salt suspension fertilizer according to the present invention, muriate of potash (KCl) would be added to the aqueous ammonia in the supply tank 17 or just prior to being fed into the in-line mixer or the centrifugal pump where they are reacted and mixed with the base material. Alternatively, a supply container 24 for muriate of potash (KCl) in powder form would feed the powder through valve 25, pipe 26 and powder pump 27 to the intake port 15 of the centrifugal pump 16, where the muriate of potash (KCl) is mixed under extreme turbulence with the aqueous ammonia and the base material. In this process, the amount of potassium chloride (KCl) is sufficient for the endothermic heat of its solution to counteract the exothermic heat of reaction of the aqueous ammonia and base material. Thus, it is desirable that the ratio of potassium as $K_2O$ to phosphorus expressed as $P_2O_5$, be above 0.5 to 1.

Alternatively, the potassium chloride or muriate of potash can be included in the base material, a preferred formulation thereof having an N-P-K ratio of 1-3-3, with a grade formulation of 6-18-18. The base N-P-K formulation and aqueous ammonia are separately and simultaneously pumped from storage tanks into the centrifugal pump 16 or an in-line mixer, where they are mixed in an extremely turbulent environment, and the resulting product discharged either to storage or nurse tanks.

The resulting salt suspension fertilizer having free aqueous ammonia is a creamy textured fluid suspension having an average particle size of 2 microns with a mean of from 2 to 4 microns. This is compared to a requirement that salt suspension and slurry fertilizers have a particle size no greater than 20 mesh to be commercially feasible.

In order to give a fuller understanding of the present invention but with no intention to be limited thereon, the following specific examples are hereby given.

Example 1

An 11-36-0 base suspension prepared as indicated above by neutralizing wet process phosphoric acid with diammonium phosphate was fed under positive displacement pressure to a centrifugal pump. Simultaneously aqueous ammonia which has been previously mixed with muriate of potash or KCl in the desired proportions was fed by a positive displacement pump to the centrifugal pump, where the materials were mixed under extremely turbulent conditions. The product discharged had a creamy texture and while in storage for a period of over one week, did not segregate. The resulting formulation was a 16-12-12 salt suspension fertilizer having aqueous ammonia. When the same materials in the same proportions had been admixed according to conventional methods, as by adding the 11-36-0 base suspension and the KCl to aqueous ammonia in a vessel and mixed with a propeller type agitator, the corresponding salt suspension fertilizer slurry product had been found to contain coarse-particles and tended to segregate rapidly, thereby forming a viscous mud and a very thin supernatant liquid. This latter type of product would be very difficult to store or apply uniformly.

Example 2

A 6-14-14 base suspension formulation was made from ammonia, wet process phosphoric acid, water, potassium chloride and sulfuric acid. This base material formulation and aqueous ammonia were separately and simultaneously pumped into the centrifugal pump for extreme turbulent mixing, at relative rates to form a 12–9–9 grade salt suspension fertilizer having aqueous ammonia. The resultant product was pumped directly to storage and remained there for three months. It was then pumped from storage with only negligible losses and exhibited a creamy texture and very little, if any, segregation. In comparison, a 12–9–9 slurry was made by mixing wet process phosphoric acid, aqueous ammonia and water with subsequent addition of potassium chloride. The mixture was pumped through a heat exchanger to prevent loss of ammonia by vaporization. The resultant product segregated rapidly in storage and could not be pumped out because of heavy sedimentation.

The above description and details given in the form of examples are in no way to be regarded as limitations on the present invention, but are only illustrative thereof. Other modifications and equivalents will be apparent to those skilled in the art from the foregoing description.

I claim, as my invention:

1. In a process for manufacturing a salt suspension fertilizer containing potassium chloride, free aqueous ammonia and triammonium phosphate trihydrate, from a base material containing the dicalcium phosphate as a suspending agent and comprising a monoammonium phosphate and diammonium phosphate base salt suspension having a nitrogen to phosphorus ratio of from 1:3 to 1:4, the steps comprising:

separately feeding the said monoammonium-diammonium base suspension and aqueous ammonia to an extremely turbulent mixing zone, to thereby effect an exothermic reaction forming triammonium phosphate trihydrate in aqueous ammonia as part of the suspension;

while feeding the aqueous ammonia into the mixing zone, simultaneously feeding potassium chloride into said mixing zone in the amount of more than 0.5 part of potassium expressed as $K_2O$ per part phosphorus expressed as $P_2O_5$, said amount being sufficient for the endothermic heat of solution of the potassium chloride dissolving in the base material salt suspension counteracting the exothermic heat of reaction of the aqueous ammonia and the base material, simultaneously turbulently mixing the aqueous ammonia, potassium chloride and the monoammonium and diammonium phosphate base material and their resultant products in the mixing zone; and withdrawing the resultant salt suspension fertilizer from the mixing zone.

2. The process of claim 1 wherein the step of turbulently mixing comprises mixing in a centrifugal pump.

References Cited

UNITED STATES PATENTS

| | | | |
|---|---|---|---|
| 1,983,782 | 12/1934 | Shropshire | 252—359.3UX |
| 2,021,143 | 11/1935 | Calcott et al. | 252—314X |
| 2,116,866 | 5/1938 | Kniskern et al. | 71—36X |
| 3,019,099 | 1/1962 | Walters | 71—43X |
| 3,096,168 | 7/1963 | Walters et al. | 71—34X |
| 3,109,729 | 11/1963 | Slack et al. | 71—43X |
| 3,244,500 | 4/1966 | Stinson et al. | 71—43X |
| 3,290,140 | 12/1966 | Young | 71—34 |
| 3,326,666 | 6/1967 | Walters | 71—43X |

SAMIH N. ZAHARNA, Primary Examiner

B. H. LEVENSON, Assistant Examiner

U.S. Cl. X.R.

71—43, 64